(12) United States Patent
Komatsu et al.

(10) Patent No.: US 6,997,048 B2
(45) Date of Patent: Feb. 14, 2006

(54) TIRE PRESSURE MONITORING SYSTEM

(75) Inventors: Goro Komatsu, Saitama (JP); Makoto Bessho, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 34 days.

(21) Appl. No.: 10/716,256

(22) Filed: Nov. 18, 2003

(65) Prior Publication Data
US 2004/0099055 A1    May 27, 2004

(30) Foreign Application Priority Data
Nov. 20, 2002  (JP) .............................. 2002-336333

(51) Int. Cl.
*G01M 17/02* (2006.01)
(52) U.S. Cl. .................................... 73/146.2
(58) Field of Classification Search ............... 73/146.2, 73/146.5; 340/442
See application file for complete search history.

(56) References Cited

U.S. PATENT DOCUMENTS 5,741,966 A * 4/1998 Handfield et al. ......... 73/146.5

2004/0017289 A1 * 1/2004 Brown ....................... 340/442

FOREIGN PATENT DOCUMENTS

| JP | 06-092114 | 4/1994 |
|---|---|---|
| JP | 2000-142043 | 5/2000 |

* cited by examiner

*Primary Examiner*—Max Noori
*Assistant Examiner*—Andre Allen
(74) *Attorney, Agent, or Firm*—Carrier, Blackman & Associates, P.C.; Joseph P. Carrier; William D. Blackman

(57) ABSTRACT

A tire pressure monitoring system for monitoring pressure of tires mounted on a vehicle by comparing a detected tire pressure, detected by a pressure sensor installed at each of the tires, with a predetermined value to determine whether the detected tire pressure is proper. The system includes a first temperature sensor that detects internal temperature of the tire, a second temperature sensor that detects ambient temperature at a place where the vehicle locates, and the predetermined value is corrected based on a difference between the detected tire internal temperature and ambient temperature, when the tire pressure is to be adjusted. With this, even if the tire pressure is adjusted when the tire internal temperature is higher than the ambient temperature, the tire pressure can be prevented from falling below the proper pressure when the internal temperature falls to the ambient temperature.

18 Claims, 8 Drawing Sheets

FIG. 5A
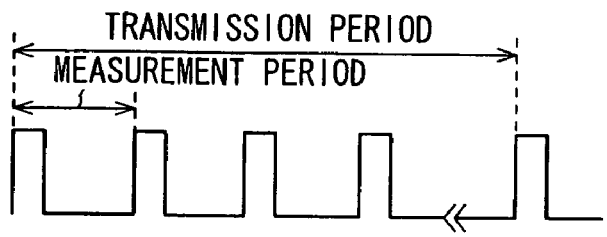
FIG. 5B
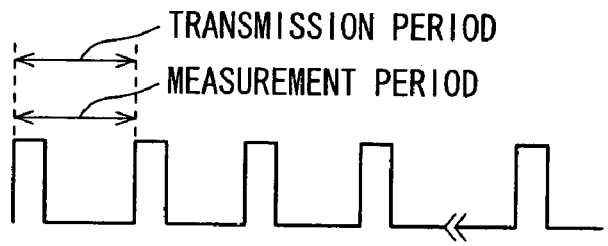
FIG. 6
TRANSMITTED DATA: ID PULSE TRAIN + PRESSURE PULSE TRAIN + TEMPERATURE PULSE TRAIN + VOLTAGE PULSE TRAIN
ID PULSE TRAIN:  FR ||||||||||||||||||||||
RR ||||||||||||||||||
FL ||||||||||||||||||
RL ||||||||||||||||||||

TIRE PRESSURE MONITORING SYSTEM

BACKGROUND OF THE INVENTION

1. Field of the Invention

This invention relates to a tire pressure monitoring system.

2. Description of the Related Art

An automobile (vehicle) driver conducting an inspection before starting can easily check the engine oil and coolant levels visually from the exterior but has no easy way to ascertain from the exterior whether the pressure of the tires is appropriate.

For overcoming this inconvenience, tire pressure monitoring systems have been proposed in which a sensor unit including a pressure sensor, transmitting antenna and the like is attached to each vehicle tire to transmit an output indicative of the tire pressure, a monitoring unit including receiving antennas is installed at a suitable location on the vehicle for receiving the outputs, and when a detected tire pressure falls below a predetermined pressure, the driver is warned by lighting a warning lamp, as taught in Japanese Laid-open patent Application No. 2000-142043 (in particular, paragraph nos. 0009 to 0013, FIG. 1 and elsewhere).

Methods for detecting tire pressure include, in addition to the above, the well-known method taught by Japanese Laid-open patent publication No. Hei 6 (1993)-92114 (in particular, paragraph no. 0021 and elsewhere) of estimating tire pressure from the output of an ABS (Antilock Brake System) wheel speed sensor.

When the internal temperature of a tire varies, its air pressure changes even though the amount of air in tire remains constant. Specifically, the air pressure rises when the internal temperature of the tire increases and falls when the internal temperature decreases. Because of this, if the tire pressure is adjusted when the internal temperature is higher than the ambient temperature, such as immediately after driving the vehicle, the tire pressure will reach the proper level with pumping of a smaller amount of air than is actually required. Since inflation is therefore discontinued before the actually required amount of air has been pumped or inflated into the tire, the tire pressure will be lower than the proper pressure when the internal temperature falls to the ambient temperature.

SUMMARY OF THE INVENTION

An object of this invention is therefore to overcome the foregoing problem by providing a tire pressure monitoring system that at the time of conducting tire pressure adjustment determines whether the tire pressure is adjusted to the proper pressure taking the tire internal temperature and ambient temperature into account, so that even if the tire pressure is adjusted when the tire internal temperature is higher than the ambient temperature, the tire pressure can be prevented from falling below the proper pressure when the internal temperature falls to the ambient temperature.

In order to achieve this object, the invention provides a system for monitoring pressure of tires mounted on a vehicle by comparing a detected tire pressure, detected by a pressure sensor installed at each of the tires, with a predetermined value to determine whether the detected tire pressure is proper, comprising: a first temperature sensor, installed at at least one of the tires, that detects internal temperature of the tire; a second temperature sensor, installed at the vehicle, that detects ambient temperature at a place where the vehicle locates; and value correcting means for correcting the predetermined value based on a difference between the detected tire internal temperature and ambient temperature, when the tire pressure is to be adjusted.

BRIEF DESCRIPTION OF THE DRAWINGS

The above and other objects and advantages of the invention will be more apparent from the following description and drawings, in which:

FIG. 5A and FIG. 5B are a set of time charts showing the tire pressure and other detection/transmission operations of a CPU illustrated in FIG. 3;

FIG. 6 is an explanatory view showing the structure of the data transmitted from the sensor units illustrated in FIG. 2;

DETAILED DESCRIPTION OF THE PREFERRED EMBODIMENT

An embodiment of the invention will now be explained with reference to the drawings.

Figure 1:
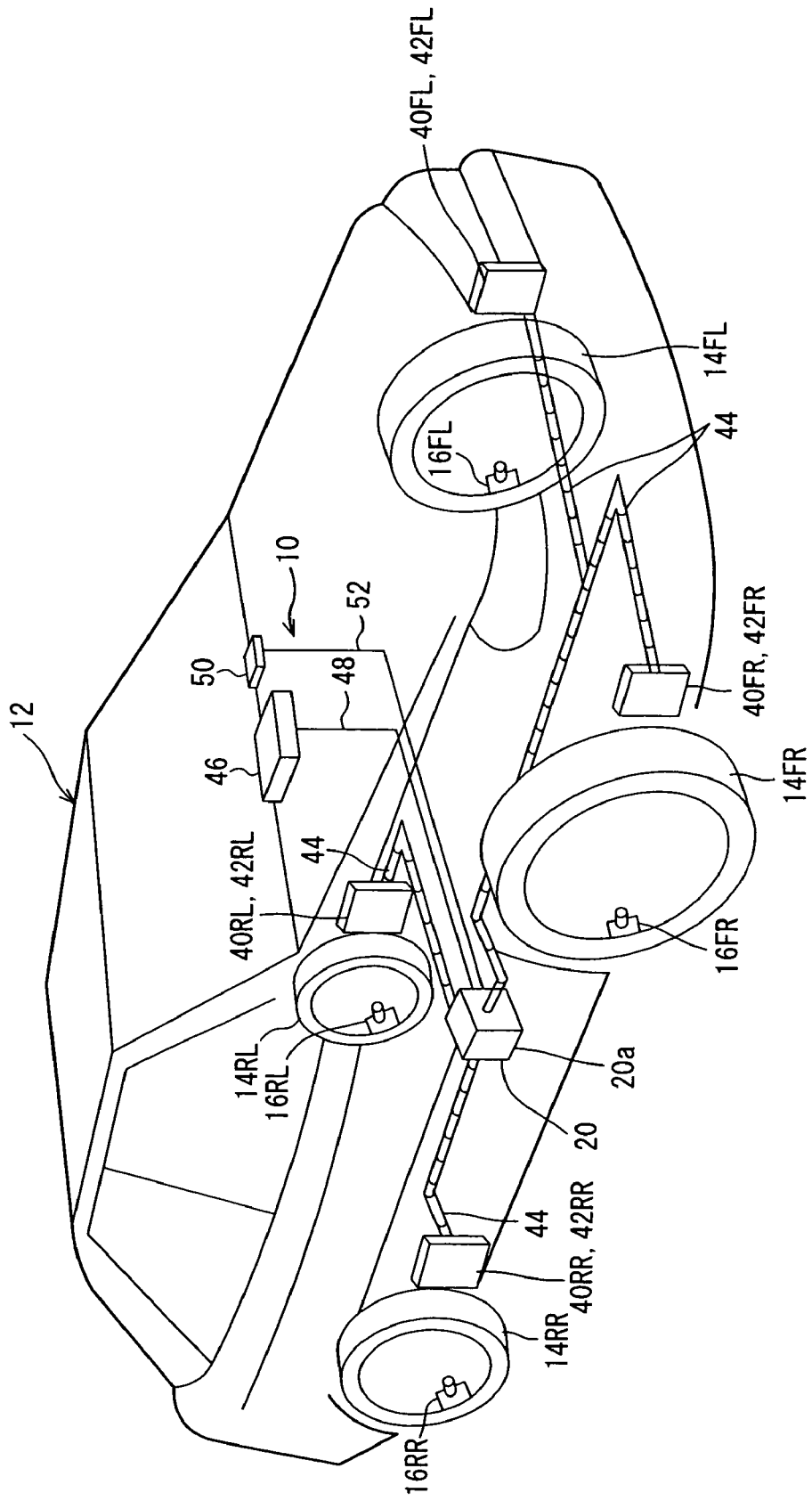
FIG. 1 is a schematic explanatory diagram showing an overall view of a tire pressure monitoring system in accordance with an embodiment of the invention.

FIG. 1 is a schematic explanatory diagram showing an overall view of a tire pressure monitoring system in accordance with an embodiment of the invention.

Reference numeral 10 designates the tire pressure monitoring system. The tire pressure monitoring system 10 is equipped with four sensor units, collectively designated by reference numeral 16, installed one at each of four tires, collectively designated by reference numeral 14, mounted on a vehicle 12, and a single monitoring unit 20 installed at an appropriate location in the passenger compartment of the vehicle 12. As illustrated, the four tires 14 and associated sensor units 16 are individually designated 14FR and 16FR (at the front right (FR)), 14RR and 16RR (at the rear right (RR)), 14FL and 16FL (at the front left (FL)), and 14RL and 16RL (at the rear left (RL)).

Figure 2:
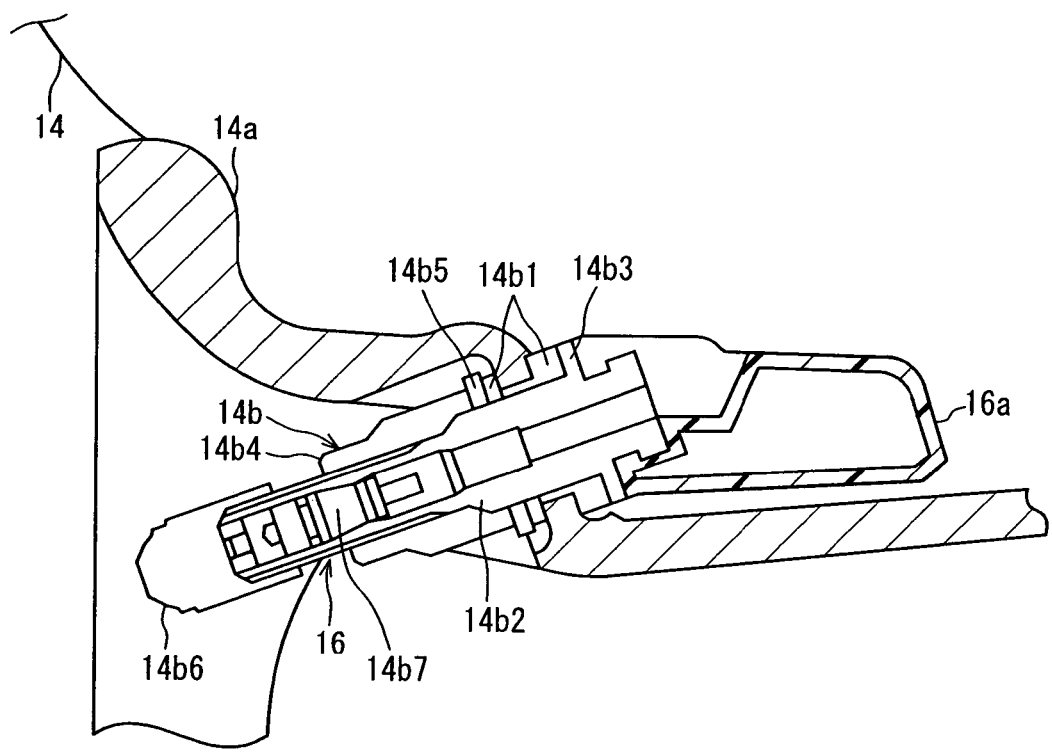
FIG. 2 is an explanatory sectional view showing the structure of a sensor unit illustrated in FIG. 1.

FIG. 2 is an explanatory sectional view showing the structure of a sensor unit 16.

As illustrated, the sensor unit 16 is structured integrally with an inflation valve 14*b* mounted on a metal wheel disk (rim) 14*a*. Grommets (bushes) 14*b*1 are interposed between the wheel disk 14*a* and the valve 14*b*. The valve 14*b* is fixed in the illustrated position by pinching the grommets 14*b*1 between a flange portion 14*b*3 formed to project from the outer periphery of a stem 14*b*2 of the valve 14*b* and a nut 14*b*4 (and washer 14*b*5). The valve 14*b* is enlarged on the inner side of the wheel disk 14*a* and the main body 16*a* of a sensor unit 16 is connected to the enlarged portion. The reference symbols 14b6 and 14b7 designate a cap and a valve core used for pumping air (inflation), respectively.

Figure 3:
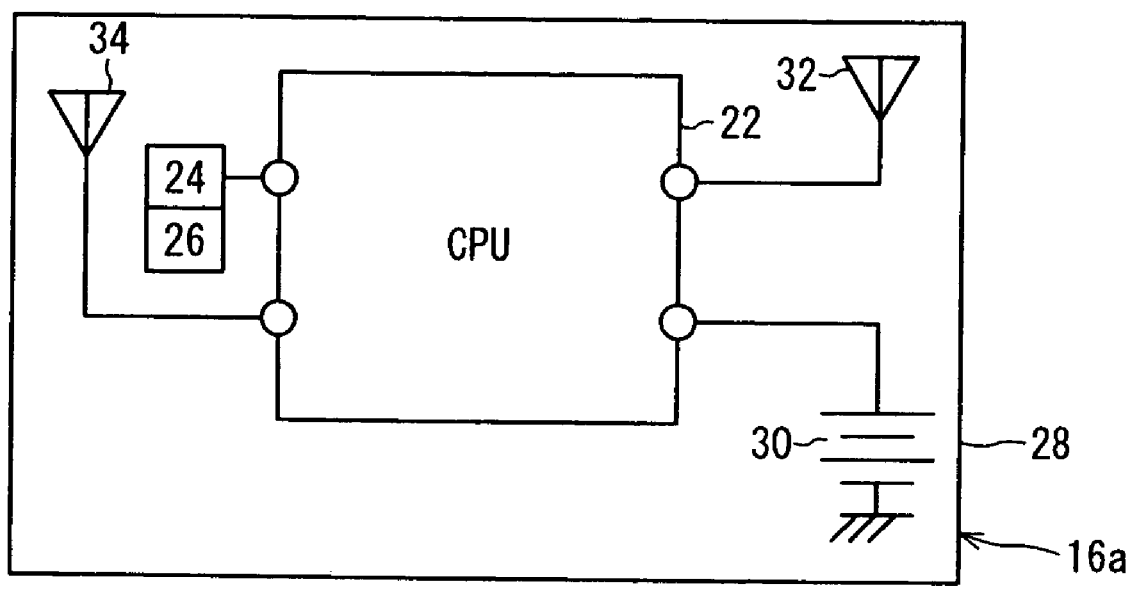
FIG. 3 is a block diagram showing the structure of a main body of the sensor unit illustrated in FIG. 1 in detail.

FIG. 3 is a block diagram showing the structure of the main body 16a of the sensor unit 16 in detail.

The main body 16a of the sensor unit 16 is equipped with a CPU (central processing unit) 22, a pressure sensor (air pressure sensor) 24 that produces an output representing the air pressure inside the wheel disk 14a, i.e., the tire pressure (air pressure), and a temperature sensor 26 that produces an output representing the temperature at its location (tire internal temperature). The outputs of the sensors 24 and 26 are sent through an A/D converter circuit (not shown) and input to the CPU 22 as digital values. The CPU 22, pressure sensor 24 and other components are mounted integrally on a single circuit board 28 in a one-chip structure.

A battery (e.g., lithium battery) 30 mounted on the main body 16a serves as the operating power source for the CPU 22. The main body 16a is further provided with a transmitting antenna 32 and a receiving antenna 34 for transmitting the outputs of the pressure sensor 24 and temperature sensor 26 to the monitoring unit 20 and receiving transmissions from the monitoring unit 20.

Although omitted from FIG. 3, a voltage sensor is provided at a suitable part of the power circuit between the battery 30 and CPU 22 and outputs a signal proportional to the output voltage of the battery 30. The output of the voltage sensor is also input to the CPU 22 after A/D conversion.

The explanation will be continued with reference to FIG. 1. The monitoring unit 20 is equipped with a main unit 20b (not shown in FIG. 1) housed in a housing 20a mounted at an appropriate location in the passenger compartment, four receiving antennas collectively designated by reference numeral 40 and four transmitting antennas collectively designated by reference numeral 42. One receiving antenna and one transmitting antenna are accommodated in each of four housings mounted near the respective tires 14. In other words, the monitoring unit 20 is equipped with receiving antennas 40FR to 40RL and transmitting antennas 42FR to 42RL mounted in association with the tires 14FR to 14RL. The receiving antennas 40 and transmitting antennas 42 are connected to the main unit 20b in the housing 20a by coaxial cables 44.

The monitoring unit 20 is further equipped with an indicator 46 installed in the dashboard near the driver's seat of the vehicle 12. The indicator 46 and the main unit 20b in the housing 20a of the monitoring unit 20 are connected via a harness 48.

A tire pressure adjustment switch 50 (SW) is provided at a suitable location in the passenger compartment and connected to the monitoring unit 20 via a harness 52.

Figure 4:
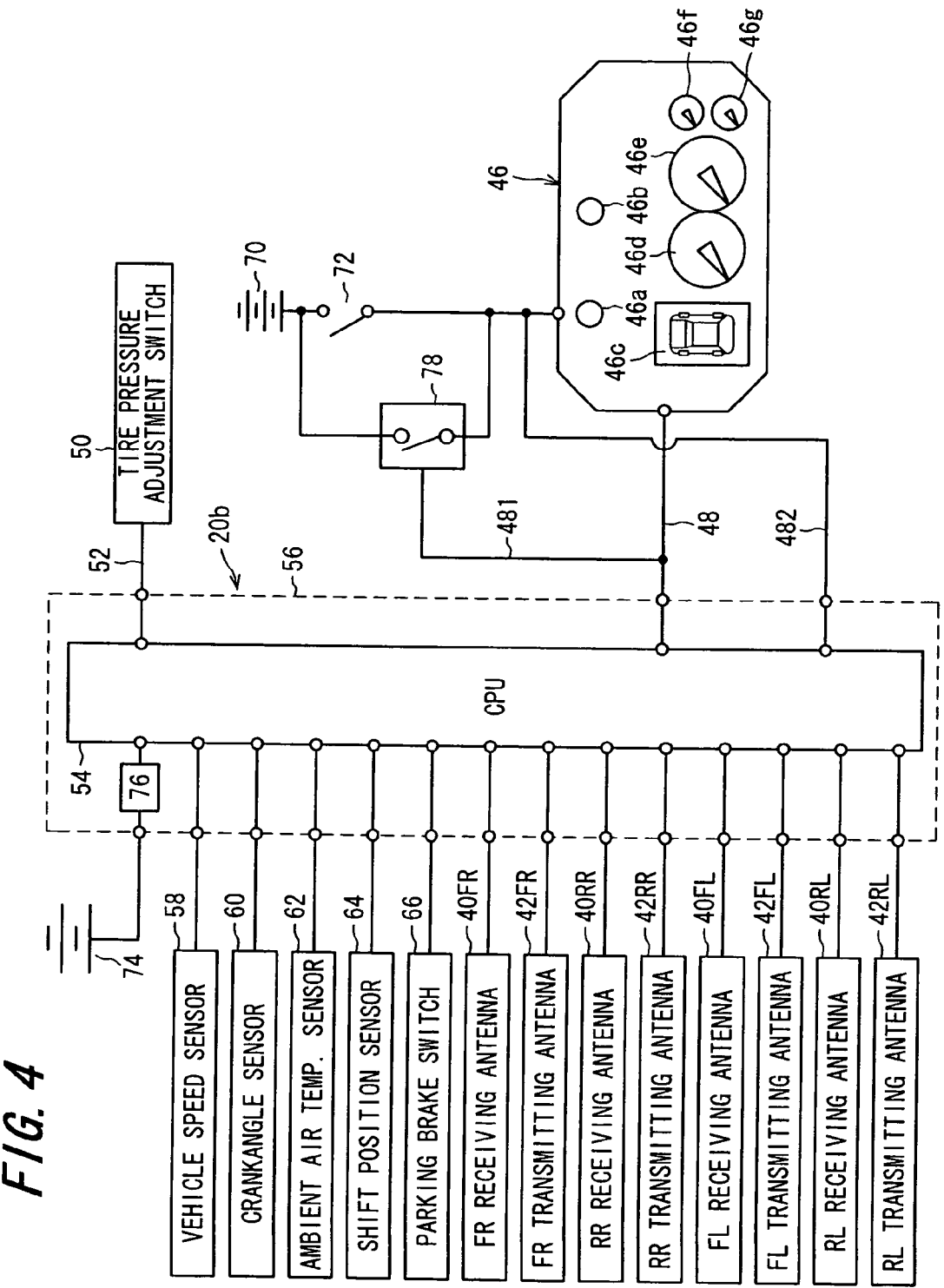
FIG. 4 is an explanatory block diagram showing the structure of a main unit and the like in a monitoring unit illustrated in FIG. 1 in detail.

FIG. 4 is an explanatory block diagram showing the structure of the main unit 20b and the like in the monitoring unit 20 in detail.

As illustrated, the main unit 20b of the monitoring unit 20 is equipped with a CPU 54. Like the main body 16a of the sensor unit 16, the CPU 54 is also mounted on a single circuit board in a one-chip structure. The CPU 54 receives data from the sensor units 16 via the receiving antennas 40 and, as explained later, transmits data from the transmitting antennas 42.

Although omitted from FIG. 1, a vehicle speed sensor 58 is installed near the driveshaft (not shown) of the vehicle 12 and sends a signal representing the vehicle speed VSP to the CPU 54.

Moreover, a crankangle sensor 60 installed near a camshaft or the crankshaft (neither shown) of the engine produces an output once every prescribed crankangle. The CPU 54 counts the crankangle sensor 60 outputs and detects the engine speed NE. An ambient air temperature sensor 62 installed at an appropriate location in the engine room (not shown) sends a signal representing the ambient air temperature TO at the present location of the vehicle 12 to the CPU 54.

A shift position sensor 64 located near the shift lever (more exactly, the automatic transmission shift lever (not shown)) installed at the drive's seat sends the CPU 54 a signal indicating the position selected by the driver among 8 positions, namely, P, R, N, D5, D4, D3, 2 and 1. A parking brake switch (SW) 66 installed near the parking brake lever (not shown) installed at the driver's seat sends the CPU 54 an ON signal when the parking brake is operated and an OFF signal when it is released.

The indicator 46 is equipped with first and second warning lamps 46a, 46b and five display panels 46c, 46d, 46e, 46f, 46d. As mentioned above, the indicator 46 is connected to main unit 20b, more specifically, to CPU 54 thereof.

The supply of operating power to the CPU 54 will be explained. As shown in FIG. 4, the indicator 46 of the monitoring unit 20 is connected to an onboard battery 70 of the vehicle 12 through an ignition switch 72 so as to be supplied with operating power for display when the driver turns on the ignition switch 72.

Differently from this, the CPU 54 of the monitoring unit 20 is connected through a constant power source circuit 76 to a second battery 74 provided separately of the onboard battery 70. As explained earlier, the sensor units 16 are powered by lithium batteries 30, for example. Then sensor units 16 therefore detect (measure) the tire pressure etc. and produce/transmit corresponding outputs even when the ignition switch 72 is OFF, i.e., when the engine (not shown) of the vehicle 12 is stopped, while the monitoring unit 20 also constantly receives these transmissions and determines whether the tire pressures are normal in the manner explained later.

When an illuminate instruction signal is output from the CPU 54 to the first and second warning lamps 46a, 46b, the display panel 46c or the like of the indicator 46, the output is sent through a signal line 481 to a switching circuit 78 to turn on the switching circuit 78 and supply operating power from the onboard battery 70. In other words, the indicator 46 enables the driver to carry out an inspection before driving with ease because warnings are lit up when the CPU 54 determines that tire pressure or the like is abnormal, irrespective of whether the ignition switch 72 is ON or OFF. When the indicator 46 is supplied with operating power, the signal concerned is also input to the CPU 54 through a signal line 482 (and a delay circuit not shown in the drdwings) so that the CPU 54 recognizes the activation of the indicator 46 after a prescribed delay.

FIG. 5 shows time charts for the tire pressure and other detection/transmission operations of the CPU 54.

FIG. 5A is a time chart of the operation when the tire pressure is normal (the method of determining whether it is normal is explained later).

When the tire pressure is normal, the CPU 22 of the sensor unit 16 concerned is input with (reads) the A/D-converted sensor outputs once every predetermined measurement period (7.0 sec, for example) and transmits the input values (detection values) to the associated receiving antenna 40 connected to the monitoring unit 20 once every transmission period (between 4.0 min and 8.0 min, for example). The transmission periods of the four sensor units 16 are slightly staggered.

The transmission of data from the transmitting antennas 32 of the sensor units 16 to the receiving antennas 40 connected to the monitoring unit 20 is conducted at a frequency of 315 MHz. The transmission of data from the transmitting antennas 42 of the monitoring unit 20 to the receiving antennas 34 of the sensor units 16, explained later, is conducted at the same frequency.

As shown in FIG. 6, the data are transmitted from the sensor units 16 in unit signals of, for example, 56 bits composed by combining an ID pulse train (explained later) with other pulse trains representing the pressure sensor output (digitized), temperature sensor output (digitized), and voltage sensor output (digitized), where the ID pulse train comprises 32 bits and the pulse trains representing the outputs of pressure sensor, temperature sensor and voltage sensor comprise 8 bits each.

As shown at the bottom of FIG. 6, the ID pulse trains comprise barcodes assigned to the individual members of a set of four tires 14 associated one each with the four sensor units 16. Specifically, a different set of barcodes is assigned to the four tires (14FL . . . ) of each vehicle 12 when it is shipped from the factory, so that every vehicle 12 has its own unique set of barcodes. Thus, each barcode (ID pulse train) specifies one tire of the set of tires of a particular vehicle.

When the CPU 54 of the monitoring unit 20 determines that the detected tire pressure of one of the four tires 14 is abnormal, it lights the appropriate one of the warning lamps (the warning lamp 46a, for example) of the indicator 46 and sends the sensor unit 16 concerned a transmission period change signal via the associated transmitting antenna 42 and receiving antenna 34. The CPU 54 attaches the ID pulse train for the tire 14 concerned to the transmitted signal.

The CPU 22 of the one of the sensor units 16FR to 16RL specified by the ID pulse train therefore recognizes that the transmission period change signal is directed to it and changes the transmission period accordingly.

The purchaser of the vehicle 12 may later rotate the tires 14. Therefore, when four sets of data transmitted from the transmitting antennas 32 of the sensor units 16 are received by the CPU 54 of the monitoring unit 20 through a receiving antenna 40 connected to the monitoring unit 20, the CPU 54 determines that the most strongly received set of data (the one with the highest signal strength) among the received sets of data is the data transmitted from the sensor unit 16 of the tire associated with the receiving antenna 40 concerned.

This will be explained more concretely taking the receiving antenna 40FR as an example. Suppose that, as shown in FIG. 1, the tire closest to the receiving antenna 40FR is 14FR. In this case, the set of data most strongly received by the receiving antenna 40FR among the sets of data transmitted for the four tires during respective transmission intervals is the set of data from the sensor unit 16FR. The CPU 54 therefore determines that the transmitted data from the sensor unit 16FR is information for the tire at the front right FR of the vehicle.

If the tires 14 are then rotated so that the one closest to the transmitting antenna 40FR becomes tire 14RL, meaning that the sensor unit closest to the receiving antenna 40FR becomes the sensor unit 16RL, the set of transmitted data most strongly received by the receiving antenna 40FR becomes that from the sensor unit 16RL. The CPU 54 therefore determines that the most strongly received set of data transmitted from the sensor unit 16RL is information for the front right tire of the vehicle and changes the ID pulse train stored in the CPU 54 for the front right tire of the vehicle from that for the sensor unit 16FR to that for the sensor unit 16RL.

The explanation will be continued with reference to FIG. 5. FIG. 5B is a time chart for when the air pressure of a tire is abnormal.

As was explained earlier, the monitoring unit 20 outputs a transmission period change signal when the tire pressure is abnormal. The associated sensor unit 16 continues to A/D-convert and read the sensor outputs once every measurement period (e.g., 7.0 sec) as theretofore but shortens the transmission period to 7.0 sec, for example, in response to the transmission period change signal.

This method is adopted in order to minimize drain on the battery 30 of the sensor unit 16, which has limited capacity, by making the transmission period long when the tire pressure etc. are normal and to increase the monitoring frequency to enable prompt issuance of warnings as is preferable when the tire pressure has been found not to be normal.

Figure 7:
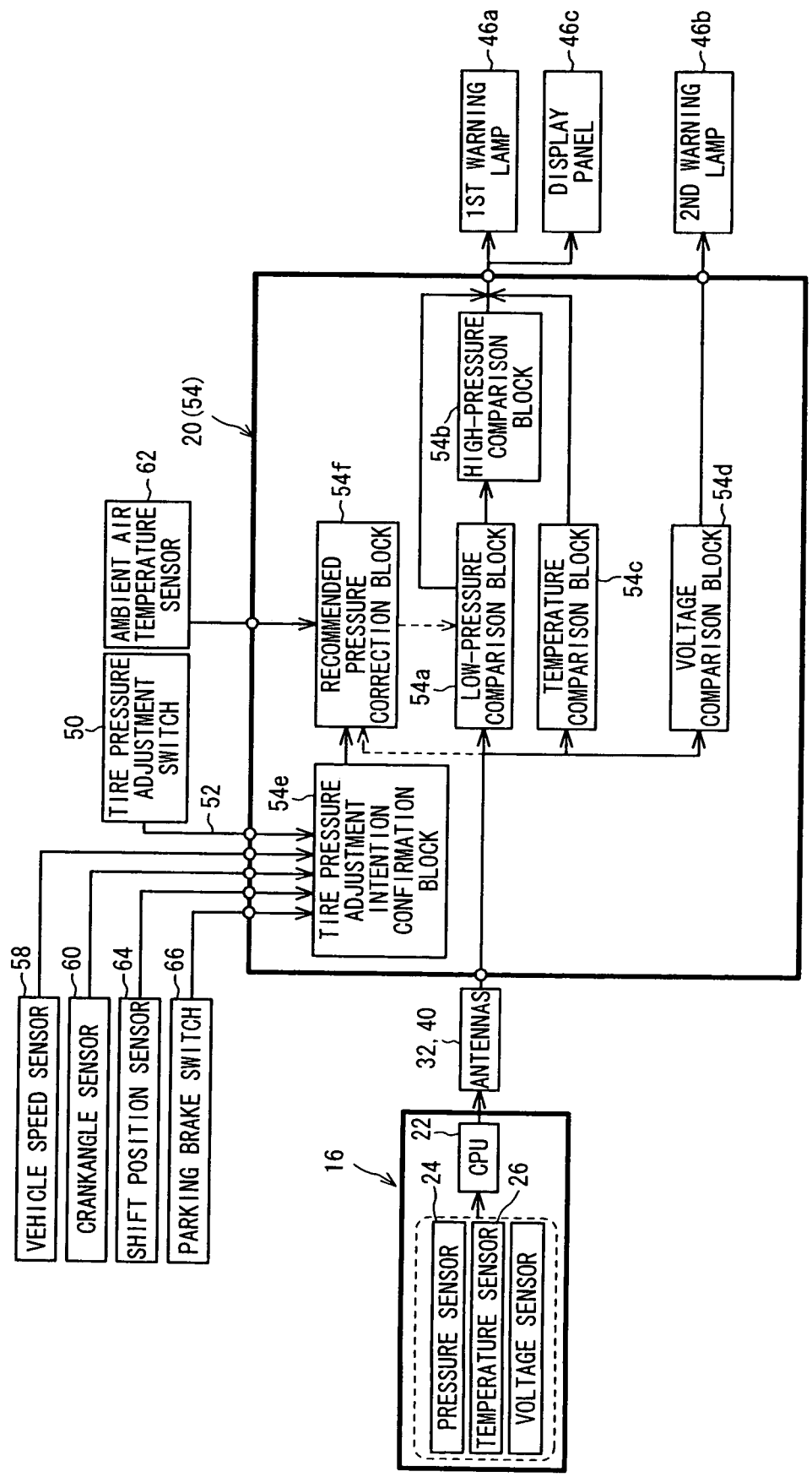
FIG. 7 is an explanatory block diagram functionally illustrating the operation of the monitoring unit, more exactly, the operation of the CPU (illustrated in FIG. 4) that constitutes the monitoring unit.

FIG. 7 is an explanatory block diagram functionally illustrating the operation of the monitoring unit 20, more exactly, the operation of the CPU 54 (illustrated in FIG. 4) that constitutes the monitoring unit 20. In other words, the CPU 54 is programmed to achieve the operation mentioned below.

The signals representing the air pressures of the four tires 14 transmitted from the sensor units 16 through the transmitting antennas 32 are input to the CPU 54 through the receiving antennas 40 and the input values (detection values of the pressure sensors 24; hereinafter called the "detected tire pressures") are compared with a first predetermined pressure in a low-pressure comparison block 54a. The first predetermined pressure is a value obtained by multiplying RCP by 0.8 (where RCP is the recommended cold pressure: the proper tire pressure value for the type of the vehicle after the vehicle has stood long enough for the tire to completely cool, i.e., when the tire internal temperature is equal to the ambient air temperature TO). The first predetermined pressure is thus set to a value lower than RCP.

When the low-pressure comparison block 54a finds that the detected tire pressure of one or more of the four tires is lower than the first predetermined pressure, the CPU 54 determines that the air pressure of the tire(s) is insufficient (abnormal), outputs an illuminate instruction signal (alarm instruction signal) to the indicator 46 to light the first warning lamp 46a, and outputs a transmission period change signal to the sensor unit(s) 16 via the antennas 42 and 34. On the other hand, when the low-pressure comparison block 54a finds that the air pressure of all four tires is equal to or higher than the first predetermined pressure, control passes to a high-pressure comparison block 54b.

The high-pressure comparison block 54b determines whether any of the detected tire pressures is higher than a second predetermined pressure. The second predetermined pressure is a value obtained by multiplying RCP by 1.3 and is therefore set to a value higher than RCP.

When the high-pressure comparison block 54b finds that any detected tire pressure is higher than the second predetermined pressure, the CPU 54 decides that the air pressure of the tire(s) is excessive (abnormal), outputs an illuminate instruction signal to light the first warning lamp 46a, and outputs a transmission period change signal to the sensor unit(s) 16 via the antennas 42 and 34. On the other hand, when the high-pressure comparison block 54b finds that the air pressure of all four tires is equal to or lower than the second predetermined pressure, i.e., when detected tire pressures are found to be equal to or higher than the first predetermined pressure and equal to or lower than the second predetermined pressure, it is determined that the air pressure of the tires is normal and an extinguish instruction signal is output to turn off the first warning lamp 46a.

The outputs from the temperature sensors 26 representing temperatures inside the wheel disks 14a for the four tires 14, i.e., the tire internal temperatures, transmitted from the sensor units 16 through the transmitting antennas 32 are input to the CPU 54 through the receiving antennas 40 and the input values (hereinafter called the "detected internal temperatures") are compared with a predetermined temperature (e.g., 80° C.) in a temperature comparison block 54c.

When the temperature comparison block 54c finds that the detected internal temperature of one or more of the four tires is higher than the predetermined temperature, the CPU 54 outputs an illuminate instruction signal to light the first warning lamp 46a, and when the temperature comparison block 54c finds that all of the detected internal temperatures are lower than the predetermined temperature, the CPU 54 outputs an extinguish signal to turn off the first warning lamp 46a.

When the first warning lamp 46a is lit by the output of a light-up instruction signal from the CPU 54, each tire concerned among the four tires is identified from its ID pulse train and its image in the vehicle diagram shown in the display panel 46c is accentuated. More specifically, when a tire 14 is in a state of excessive air pressure, insufficient air pressure or excessive internal temperature, such fact is called to the driver's attention by changing the illumination color or flashing pattern in accordance with the state of the tire 14.

Figure 8:
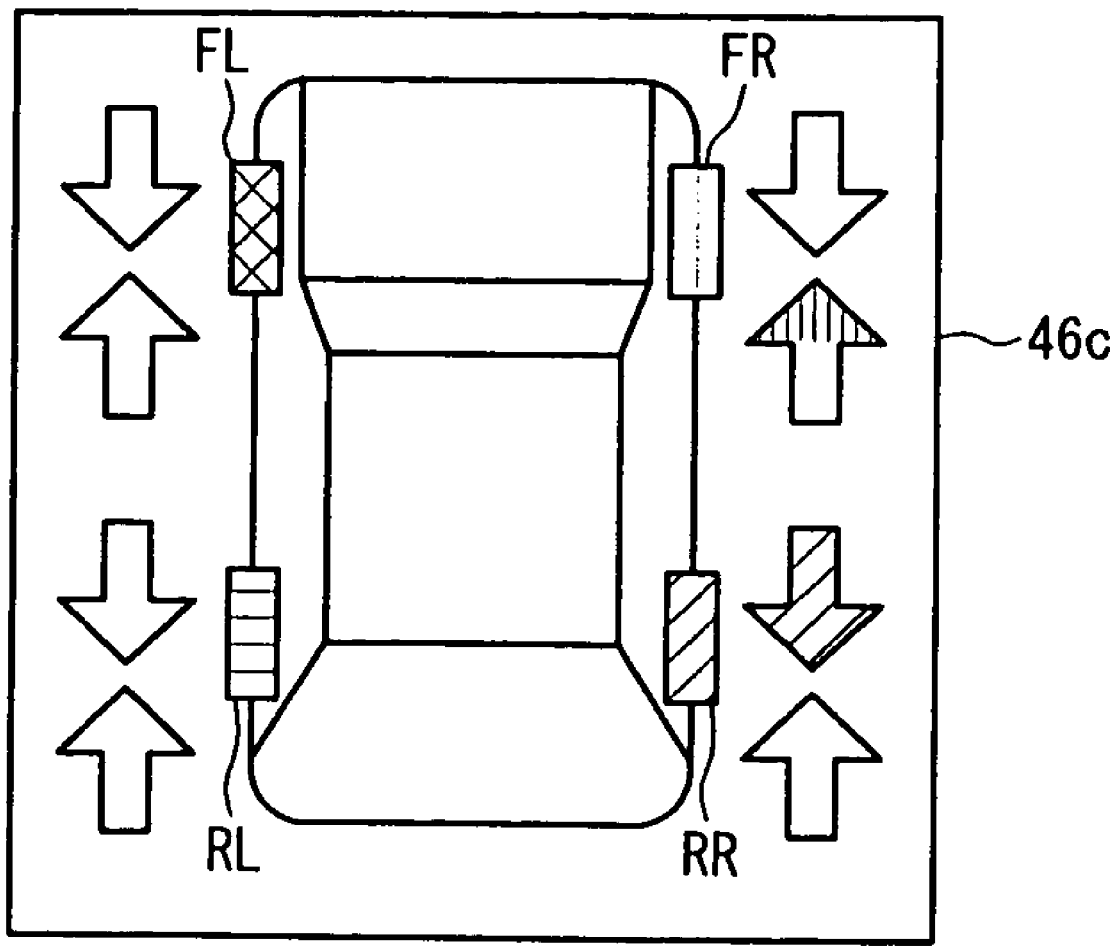
FIG. 8 is an enlarged view of a display panel illustrated in FIG. 4.

FIG. 8 is an enlarged view of the display panel 46c. In this drawing, the tire at the front left FL is crosshatched to indicate that its pressure is normal, the tire at the rear left RL is laterally hatched to indicate that its internal temperature is excessively high, the tire at the front right FR is longitudinally hatched to indicate that its pressure is insufficient, and the tire at the rear right RR is diagonally hatched to indicate that its pressure is excessive. In the actual display panel 46c, the difference in hatching is accentuated by color and flashing pattern. For example, normal tire pressure is indicated by blue, insufficient tire pressure by yellow, excessive tire pressure by red, and excessive tire interior temperature increase by flashing red. Alternatively, it is possible to express the tire pressure condition in words, such as "OK," "Low pressure," "High pressure," and "High Temperature".

As illustrated in FIG. 8, display panel 46c not only shows the condition of the tires 14 but also includes arrows indicating the direction of tire pressure adjustment (increase/decrease). The arrows of the tires at the front and rear left FL, RL are not illuminated (are left off) because their states are "normal" and "excessive internal temperature," the upward pointing arrow of the tire at the front right FR is flashed in the same color to indicate that its pressure is insufficient, and the downward pointing arrow of the tire at the rear right RR is flashed in the same color to indicate that its pressure is excessive.

The explanation will be continued with reference to the block diagram of FIG. 7. The signals representing the output voltages of the batteries 30 output by the voltage sensors and transmitted from the sensor units 16 through the transmitting antennas 32 are input to the CPU 54 through the receiving antennas 40 and the input values (hereinafter called the "detected voltages") are compared with a prescribed voltage (e.g., 1.8 V) in a voltage comparison block 54d.

When the voltage comparison block 54d finds that one or more of the detected voltages is lower than the prescribed voltage, the CPU 54 outputs an illuminate instruction signal to light the second warning lamp 46b, and when the voltage comparison block 54d finds that all of the detected voltages are equal to or higher than the detected voltage, the CPU 54 outputs an extinguish signal to turn off the second warning lamp 46b.

The CPU 54 is also equipped with a tire pressure adjustment intention confirmation block 54e. Based on the outputs of the tire pressure adjustment switch (SW) 50 and the different sensors, the pressure adjustment intention confirmation block 54e determines whether the driver wants to adjust tire pressure, more specifically, whether the driver wants to adjust tire pressure and also whether the vehicle 12 is in a state enabling tire pressure adjustment to be carried out stably or safely.

Figure 9:
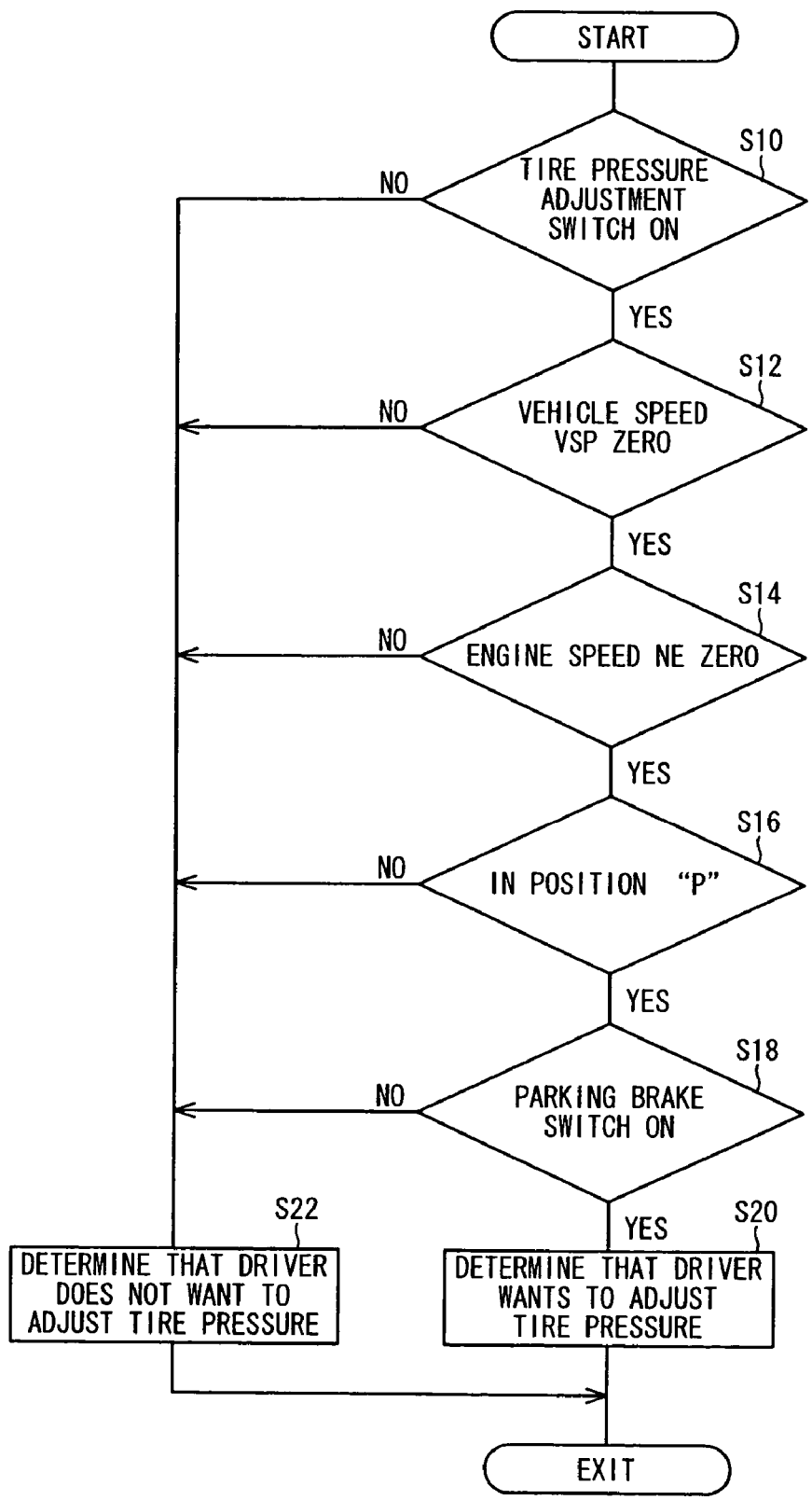
FIG. 9 is a flowchart showing the sequence of operations performed by a tire pressure adjustment intention confirmation block illustrated in FIG. 7.

FIG. 9 is a flowchart showing the sequence of operations performed by the tire pressure adjustment intention confirmation block 54e. The operation of the tire pressure adjustment intention confirmation block 54e will now be explained with reference to FIG. 9. First, in S10, it is checked whether the tire pressure adjustment switch (SW) 50 is outputting an ON signal, i.e., whether the tire pressure adjustment switch (SW) 50 has been operated by the driver.

When the result in S10 is YES, i.e., when it is found that the driver wants to adjust tire pressure, the program proceeds to S12, in which it is checked whether the vehicle speed VSP output by the vehicle speed sensor 58 is zero. When the result in S12 is YES, the program proceeds to S14, in which it is checked from the output of the crankangle sensor 60 whether the calculated engine speed NE is zero. When the result in S14 is YES, the program proceeds to S16, in which it is checked whether the shift position sensor 64 is outputting a signal indicating P (Parking) position.

When the result in S16 is YES, the program proceeds to S18, in which it is checked whether the parking brake switch (SW) 66 is outputting an ON signal, i.e., whether the parking brake is in operation. When the result in S18 is YES, meaning that the vehicle 12 is in a state enabling tire pressure adjustment to be carried out stably or safely, the program proceeds to S20, in which a final decision is made to the effect that the driver wants to adjust tire pressure. On the other hand, when the result in any of S10 to S18 is NO, the program proceeds to S22, in which it is decided that the driver does not want to adjust tire pressure (including the case where the reason is that the vehicle 12 is not in a state enabling tire pressure adjustment to be carried out stably) and the program is terminated.

The explanation will be continued with reference to the block diagram of FIG. 7. When the tire pressure adjustment intention confirmation block 54e confirms that the driver wants to adjust tire pressure, control passes to a recommended (proper) pressure correction block 54f.

The recommended (proper) pressure correction block 54f corrects the recommended cold pressure RCP based on the deviation between the ambient air temperature TO output by the ambient air temperature sensor 62 and the internal temperature of the tire 14 concerned output by the associated sensor unit 16.

Specifically, the corrected value RCP' of the recommended cold pressure RCP is calculated according to Equation 1.

$$RCP' = RCP \times K \times (TT/TO) \qquad \text{Eq. 1,}$$

where TT is the internal temperature of the tire 14 and K is a coefficient determined experimentally beforehand. The set value of K differs by vehicle type depending on the size and aspect ratio of the tire 14 and the load it bears.

As is clear from Equation 1, the corrected recommended cold pressure value RCP' increases in proportion as the deviation between tire interior temperature TT and ambient air temperature TO increases, i.e., as the tire interior temperature TT rises above the ambient air temperature TO. More specifically, corrected value RCP' is calculated to increase in proportion to the pressure rise produced by temperature rise when the volume (tire volume) in the gas state equation is assumed to be constant.

The corrected recommended cold pressure value RCP' calculated by the recommended (proper) pressure correction block 54f is output to the low-pressure comparison block 54a. After receiving the corrected recommended cold pressure value RCP', the low-pressure comparison block 54a decides the properness of the air pressure of the tires 14 based on the corrected value RCP' rather than the recommended cold pressure RCP.

Specifically, the low-pressure comparison block 54a multiplies the corrected recommended cold pressure value RCP' by 0.8 and sets the product as the first predetermined pressure. When one or more detected tire pressures is found to be lower than the set value, the CPU 54 determines that the air pressure of the tire(s) is insufficient (abnormal) and outputs an illuminate instruction signal (alarm instruction signal) to the indicator 46 to light the first warning lamp 46a.

If the interior temperature TT of a tire 14 is higher than the ambient air temperature TO at this time, the value of the corrected recommended cold pressure value RCP' becomes greater than that of the recommended cold pressure RCP, so that the first predetermined pressure obtained by multiplying the corrected recommended cold pressure value RCP' by 0.8 also increases. In other words, the value of the first predetermined pressure becomes larger when the interior temperature TT of the tire 14 is high than when the tire 14 is cold.

Therefore, when the driver notices that the first warning lamp 46a indicating deficient air pressure of one or more tires 14 is lit and carries out tire pressure adjustment at a time when the interior temperature TT of the tire 14 is still higher than the ambient air temperature TO, such as immediately after stopping the vehicle 12, the first warning lamp 46a will not turn off unless the tire pressure is raised to a higher value than that when the tire is cold. In other words, the driver will pump or inflate the tire 14 with the amount of air that actually should be pumped. Therefore, when the interior temperature TT decreases to the ambient air temperature TO, the tire pressure will not fall below the recommended cold pressure, more specifically, will not fall below the first predetermined pressure for the cold tire. As a result, the driving stability (safety) of the vehicle 12 is ensured. Moreover, the burden on the driver is also reduced because the driver is relieved of the troublesome task of readjusting the tire pressure in response to another warning indicating low tire pressure.

The explanation will be continued with reference to the block diagram of FIG. 7. When the low-pressure comparison block 54a finds that the air pressure of all four tires is equal to or higher than the first predetermined pressure calculated from the corrected value RCP', control passes to the high-pressure comparison block 54b. When the high-pressure comparison block 54b finds that any detected tire pressure is higher than a second predetermined pressure set to the value obtained by multiplying the corrected recommended cold pressure value RCP' by 1.3, the CPU 54 decides that the air pressure of the tire(s) is excessive (abnormal) and outputs an illuminate instruction signal to light the first warning lamp 46a.

On the other hand, when the high-pressure comparison block 54b finds that the air pressure of all four tires is equal to or lower than the second predetermined pressure based on the corrected value RCP', it is determined that the air pressure of the tires is normal and an extinguish instruction signal is output to turn off the first warning lamp 46a.

As explained in the foregoing, the tire pressure monitoring system 10 according to this embodiment is configured so that when the tire pressure adjustment intention confirmation block 54e confirms that the driver wants to adjust tire pressure, the recommended (proper) pressure correction block 54f uses the temperature sensor 26 of the sensor unit 16 concerned to detect the interior temperature TT of the tire 14 concerned, uses the ambient air temperature sensor 62 to detect the ambient air temperature TO at the present location of the vehicle 12, and corrects the recommended cold pressure RCP (calculates the corrected value RCP') from the deviation between the detected interior temperature TT and the ambient air temperature TO. Owing to this configuration, when the tire pressure adjustment is carried out, it is possible to tell whether the tire pressure is adjusted to the recommended pressure taking the interior temperature TT and ambient air temperature TO into consideration (more exactly, to the first predetermined pressure calculated based on the corrected value RCP'). Therefore, even if the tire pressure is adjusted when the interior temperature TT is higher than the ambient air temperature TO, the tire can be pumped or inflated with the amount of air that actually should be pumped and, as a result, the tire pressure will not fall below the recommended cold pressure (more specifically, the first predetermined pressure for the cold tire calculated from the recommended cold pressure) when the interior temperature TT decreases to the ambient air temperature TO.

Thus, the embodiment is arranged to have a system 10 for monitoring pressure of tires 14 mounted on a vehicle 12 by comparing a detected tire pressure, detected by a pressure sensor 24 installed at each of the tires, with a predetermined value to determine whether the detected tire pressure is proper, comprising: a first temperature sensor 26, installed at at least one of the tires, that detects internal temperature of the tire TT; a second temperature sensor 62, installed at the vehicle, that detects ambient temperature at a place where the vehicle locates TO; and value correcting means (monitoring unit 20, specifically, recommended tire pressure correction block 54f, more specifically, the CPU 54 constituting the monitor unit 20 is programmed to have the block 54f) for correcting the predetermined value based on a difference between the detected tire internal temperature and ambient temperature, when the tire pressure is to be adjusted. Notably, the first temperature sensor 26 is sufficient if it is installed at at least one of the tires 14.

In the system, the value correcting means corrects the predetermined value such that the predetermined value is increased with increasing difference between the detected temperatures. More specifically, the value correcting means corrects the predetermined value such that the predetermined value is increased as the detected tire internal temperature rises above the detected ambient temperature. The predetermined value is set based on a recommended cold pressure (RCP).

In the system, the value correcting means corrects the predetermined value based on the difference between the detected temperatures when it is determined to be in a state that the tire pressure is to be adjusted stably (tire pressure adjustment intention confirmation block 54e).

Although it was explained in the foregoing that the light-up instruction signal and flash instruction signal are sent to the indicator 46 to light or flash the first warning lamp 46a, it is alternatively possible to provide a remote keyless entry device or other such portable terminal device and send the light-up (flash) instruction signals to this. This further enhances driver convenience because it enables the driver (and the vehicle manufacturer/dealer before the vehicle is sold) to carry out the tire pressure adjustment task with the remote keyless entry device held in the hand.

Moreover, the invention is not limited to the use of the visual alarm indicator 46 as the alarm means as explained in the foregoing and it is alternately possible to use an audible alarm such as a speaker or buzzer, either alone or in combination with visual alarm means.

In the first aspect of the invention, the tire interior temperature and the ambient temperature at the present location of the vehicle are detected at the time of tire pressure adjustment, and the proper pressure is corrected based on the deviation between the detected tire interior temperature and ambient temperature, more specifically, is set to a higher value in proportion as the tire interior temperature rises above the ambient temperature. Owing to this configuration, it becomes possible when carrying out tire pressure adjustment to determine whether or not tire pressure is adjusted to the proper pressure taking into account the tire interior temperature and the ambient temperature. Therefore, even if the tire pressure is adjusted when the interior temperature is higher than the ambient air temperature, the tire can be pumped or inflated with the amount of air that actually should be pumped and, as a result, the tire pressure will not fall below the proper pressure when the interior temperature decreases to the ambient air temperature.

The entire disclosure of Japanese Patent Application No. 2002-336333 filed on Nov. 20, 2002, including specification, claims, drawings and summary, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for monitoring pressure of tires mounted on a vehicle by comparing a detected tire pressure, detected by a pressure sensor installed at each of the tires, with a predetermined value to determine whether the detected tire pressure is proper, comprising:
    a first temperature sensor, installed at at least one of the tires, that detects internal temperature of the tire;
    a second temperature sensor, installed at the vehicle, that detects ambient temperature at a place where the vehicle locates; and
    value correcting means for correcting the predetermined value based on a difference between the detected tire internal temperature and ambient temperature, when the tire pressure is to be adjusted.

2. A system according to claim 1, wherein the value correcting means corrects the predetermined value such that the predetermined value is increased with increasing difference between the detected temperatures.

3. A system according to claim 2, wherein the value correcting means corrects the predetermined value such that the predetermined value is increased as the detected tire internal temperature rises above the detected ambient temperature.

4. A system according to claim 1, wherein the predetermined value is set based on a recommended cold pressure.

5. A system according to claim 1, wherein the value correcting means corrects the predetermined value based on the difference between the detected temperatures when it is determined to be in a state that the tire pressure is to be adjusted stably.

6. A method of monitoring pressure of tires mounted on a vehicle by comparing a detected tire pressure, detected by a pressure sensor installed at each of the tires, with a predetermined value to determine whether the detected tire pressure is proper, comprising the steps of:
    detecting internal temperature of the tire;
    detecting ambient temperature at a place where the vehicle locates; and
    correcting the predetermined value based on a difference between the detected tire internal temperature and ambient temperature, when the tire pressure is to be adjusted.

7. A method according to claim 6, wherein the step of value correction corrects the predetermined value such that the predetermined value is increased with increasing difference between the detected temperatures.

8. A method according to claim 7, wherein the step of value correction corrects the predetermined value such that the predetermined value is increased as the detected tire internal temperature rises above the detected ambient temperature.

9. A method according to claim 6, wherein the predetermined value is set based on a recommended cold pressure.

10. A method according to claim 6, wherein the step of value correction corrects the predetermined value based on the difference between the detected temperatures when it is determined that the vehicle is in a state that the tire pressure is to be adjusted stably.

11. A computer program embodied on a computer-readable medium for monitoring pressure of tires mounted on a vehicle by comparing a detected tire pressure, detected by a pressure sensor installed at each of the tires, with a predetermined value to determine whether the detected tire pressure is proper, comprising the steps of:
    detecting internal temperature of the tire;
    detecting ambient temperature at a place where the vehicle locates; and
    correcting the predetermined value based on a difference between the detected tire internal temperature and ambient temperature, when the tire pressure is to be adjusted.

12. A system for monitoring pressure of tires mounted on a vehicle having a microcomputer or microprocessor that compares a detected tire pressure, detected by a pressure sensor installed at each of the tires, with a predetermined value to determine whether the detected tire pressure is proper, comprising:
    a first temperature sensor, installed at at least one of the tires, that detects internal temperature of the tire; and
    a second temperature sensor, installed at the vehicle, that detects ambient temperature at a place where the vehicle locates;
    the microcomputer is programmed to correct the predetermined value based on a difference between the detected tire internal temperature and ambient temperature, when the tire pressure is to be adjusted.

13. A system according to claim 5, wherein the system is determined to be in a state in which the tire pressure can be adjusted stably by monitoring sensor output from at least a tire pressure adjustment switch.

14. A system according to claim 13, wherein when the system is determined to be in a state that the tire pressure is to be adjusted stably, the value correcting means corrects the predetermined value based on the difference between the detected temperatures.

15. A system according to claim 5, wherein the system is determined to be in a state that the tire pressure can be adjusted stably by monitoring sensor output from a vehicle speed sensor, a crankshaft sensor, a shift position sensor, and a tire pressure adjustment switch, and wherein when the system is determined to be in a state that the tire pressure is to be adjusted stably, the value correcting means corrects the predetermined value based on the difference between the detected temperatures.

16. A system according to claim 10, wherein the system is determined to be in a state in which the tire pressure can be adjusted stably by monitoring sensor output from at least a tire pressure adjustment switch.

17. A system according to claim 16, wherein when the system is determined to be in a state that the tire pressure is to be adjusted stably, the value correcting means corrects the predetermined value based on the difference between the detected temperatures.

18. A method according to claim 10, wherein it is determined that the system is in a state that the tire pressure can be adjusted stably by monitoring sensor output from a vehicle speed sensor, a crankshaft sensor, a shift position sensor, and a tire pressure adjustment switch, and wherein when the system is determined to be in a state that the tire pressure is to be adjusted stably, the value correcting means corrects the predetermined value based on the difference between the detected temperatures.

* * * * *